United States Patent
Hashizume et al.

(10) Patent No.: US 7,403,681 B2
(45) Date of Patent: Jul. 22, 2008

(54) WAVELENGTH SELECTIVE OPTICAL DEVICE AND METHOD OF TUNING WAVELENGTH CHARACTERISTICS

(75) Inventors: Hideki Hashizume, Tokyo (JP); Kenichiro Takeuchi, Somerset, NJ (US); Haiguang Lu, Somerset, NJ (US)

(73) Assignee: Nippon Sheet Glass Company, Ltd., Tokyo (JP)

( * ) Notice: Subject to any disclaimer, the term of this patent is extended or adjusted under 35 U.S.C. 154(b) by 62 days.

(21) Appl. No.: 11/370,234

(22) Filed: Mar. 8, 2006

(65) Prior Publication Data

US 2007/0211993 A1 Sep. 13, 2007

(51) Int. Cl.
*G02B 6/32* (2006.01)
*G02B 6/26* (2006.01)

(52) U.S. Cl. .............................. 385/34; 385/24; 385/27
(58) Field of Classification Search ........................ None
See application file for complete search history.

(56) References Cited

U.S. PATENT DOCUMENTS

| | | | | |
|---|---|---|---|---|
| 4,501,468 A | * | 2/1985 | Borrelli et al. | 359/654 |
| 4,639,094 A | * | 1/1987 | Aono | 359/654 |
| 5,117,308 A | * | 5/1992 | Tsuchida et al. | 359/654 |
| 5,323,268 A | * | 6/1994 | Kikuchi | 359/664 |
| 5,488,506 A | * | 1/1996 | Krisvoshlykov et al. | 359/341.1 |
| 5,799,121 A | | 8/1998 | Duck et al. | |
| 6,018,603 A | * | 1/2000 | Lundgren et al. | 385/33 |
| 6,084,994 A | | 7/2000 | Li et al. | |
| 2005/0100276 A1 | * | 5/2005 | Hashizume et al. | 385/34 |

* cited by examiner

*Primary Examiner*—Rodney Bovernick
*Assistant Examiner*—Mike Stahl
(74) *Attorney, Agent, or Firm*—Whitham Curtis Christofferson & Cook, P.C.

(57) ABSTRACT

In a wavelength selective optical device, a lens for transmitting multiplexed optical signals having a plurality of wavelengths is provided to face an end of a first optical fiber such that light output from the end of the first optical fiber is converted into parallel light, and an optical filter is provided at a location to which the parallel light output from the lens is input. A second optical fiber is provided at a location in which the light reflected from the optical filter is input to the lens again to be focused by the lens. The lens is configured by bonding the ends of two gradient index rod lenses having different refractive index distribution constants and the substantially same outer diameter to each other to align their optical axes to each other.

6 Claims, 4 Drawing Sheets

WAVELENGTH SELECTIVE OPTICAL DEVICE AND METHOD OF TUNING WAVELENGTH CHARACTERISTICS

BACKGROUND OF THE INVENTION

1. Field of the Invention

The present invention relates to a wavelength selective optical device used in a wavelength multiplexing method for superposing optical signals with a plurality of wavelengths and transmitting the optical signals through one optical fiber in an optical communication field. In particular, the present invention relates to a wavelength selective optical device employing an optical filter as a wavelength selecting element and a method of tuning the same.

2. Related Art

In optical communication field or the like, there are known various devices utilizing the nature of the wavelength of light for controlling transmission and transferring of information. For example, the wavelength division multiplexing large-capacity optical communication (Dense Wavelength Division Multiplexing (DWDM), Coarse Wavelength Division Multiplexing (CWDM), or the like) in which multi-wavelength laser beams with narrow line width are superposed at a high density and then input/output into/from one optical fiber is now spreading. In this wavelength division multiplexing optical communication, a desired wavelength signal (channel) must be demultiplexed from the multiplexed light signals or conversely multiplexed to such multiplexed light signals to bundle them into one optical fiber.

The center wavelength and the wavelength width of each channel is normalized respectively. The optical coupler constituting the system must select only a desired channel signal and pick it up at low loss, and must prevent crosstalks of unselected signals between its adjacent channels and its outside channels.

In a high-density wavelength division multiplexing system such as the DWDM, CWDM or the like utilizing the dielectric multi-layered optical interference filter as a wavelength division element, in order to enhance the isolation between the picked-ups signal and reduce the crosstalk between them, the light transmitted through the filter is used to select the signal and also the reflected light including the residual reflection is treated as the express signal for the optical coupler on the subsequent stage.

As an optical filter, various optical filters such as a band pass filter (BPF) for passing only a predetermined wavelength band, a shortwave pass filter (SWPF) for passing only a shorter wavelength side than the predetermined wavelength, a longwave pass filter (LWPF) for passing a wavelength longer than the predetermined wavelength, etc. are present in compliance with the applications. Normally, BPF is used in DWDM or CWDM.

Here, of importance are (1) both-side wavelength edges of the pass wavelength band of BPF are positioned on the outsides of the wavelengths on both ends of the selected channel, and a signal loss of the signal in all wavelength bands in the channel is small (2) both-side wavelength edges are positioned such that the pass wavelength band of BPF does not contain wavelength bands of adjacent unselected channels, and crosstalks of unselected channels are suppressed sufficiently small.

Characteristics of BPF such as the wavelength bandwidth, the crosstalk blocking amount (isolation), etc. are decided substantially by the filter design. However, values of the filter such as the edge wavelength, the center wavelength, etc. are varied every lot at the time of filter production. Also, these values are varied to some extent in a sheet of glass substrate. For this reason, an amount of wavelength shift must be tuned (the wavelength tuning must be applied) consciously at the time of assembling the optical coupler to make the optical coupler conform to the standard of the optical system (component) using this optical coupler as the constituent element.

For example, in the case of 100 GHz DWDM system, a channel interval is about 0.8 nm and a channel bandwidth is about 0.22 nm. Therefore, it is possible that the performance characteristic of the component is largely affected even by a small wavelength deviation such as about 0.1 nm.

FIG. 1 shows a concept to tune the center wavelength of BPF. Assume that, when an incident light is incident on the BPF manufactured based on predetermined design values in compliance with a predetermined method, the passing characteristic of BPF, illustrated by light intensity P, is given as indicated by a broken line. This indicates that the center wavelength is deviated from a center wavelength $\lambda p$ of the specified channel (x) to the longer wavelength side and that a loss is increased on the shorter wavelength side than the channel bandwidth of the channel (x) to be selected. Also, the crosstalk in the unselected channel (x+1) on the longer wavelength side is increased. Therefore, the wavelength tuning must be applied to this characteristic as indicated by a solid line by any method.

Meanwhile, in the dielectric multi-layered optical filter having the wavelength selectivity, when an incident angle of an incident light is changed, the wavelength edge is changed, or the center wavelength of the pass band together with the wavelength edge, if the filter is BPF, is changed. Normally the center wavelength is shifted to the shorter wavelength side by the oblique incidence in contrast to the vertical incidence. Consequently, it is feasible to execute the above wavelength tuning by utilizing this phenomenon.

FIG. 2 is a sectional view showing a basic structure of the wavelength division multiplexing optical coupler using a graded index rod lens. This optical coupler is assembled by optically tuning/fixing a subassembly, which is constructed by pasting an optical filter chip 40 onto a lens surface 33 of a dual optical fiber collimator 20, and a single fiber collimator 10. This dual optical fiber collimator 20 consists of a dual optical fiber pigtail 21 and a graded index rod lens 31. This single optical fiber collimator 10 consists of a single optical fiber pigtail 22 (dual optical fiber pigtail may also be employed) and a graded index rod lens 32.

An emitted light from one optical fiber 23 is incident on one end surface of the graded index rod lens 31. Assume that a lens length of the rod lens is a 0.25 pitch (¼ of a ray sinusoidal wave path period (pitch) peculiar to the graded index rod lens), an emitted light from the rod lens 31 is collimated into a parallel light beam. Then, a light contained in this parallel light beam in a predetermined wavelength range is reflected by the optical filter 40, then is converged again by the rod lens 31, and then is coupled to another optical fiber 24.

Also, a light other than lights in a light reflecting wavelength range is transmitted through the optical filter 40, then is converged by the rod lens 32 of the single fiber collimator 10, and then is coupled to the optical fiber 25. The signal light is wavelength-separated via such optical paths to reflect the optical characteristics of the filter.

As the prior art associated with the wavelength tuning of the filter, in U.S. Pat. No. 5,799,121, for example, the technology of changing the incident angle of the light into the optical filter by changing an alignment distance of two optical fibers to tune the center wavelength is set forth. In other words, an incident position of the light into the rod lens 31 is changed by changing a distance (an offset amount of the optical fiber, see FIG. 2) d between an optical axis of the pigtail 21 and optical axes of the optical fibers 23, 24, and thus the incident angle (φ) into the optical filter 40 is changed. When an optical fiber distance 2d (normally two optical fibers 23, 24 are arranged at an equal distance from the optical axis of the rod lens 31) is increased, the center wavelength of the selected signal is shifted to the shorter wavelength side.

Similarly, in U.S. Pat. No. 6,084,994, a mode of so-called dual optical fiber pigtail is constructed by fixing two optical fibers in the holder at a predetermined distance to actually suit the production of the optical coupler. Since the incident angle of the light into the optical filter can be changed by changing the distance between the optical axes of the optical fibers by exchanging the holder, it is possible to tune the center wavelength.

In the above method of tuning the selected center wavelength by adjusting the core distance of two optical fibers, there existed problems described in the following.

A core distance of two optical fibers becomes minimum when two optical fibers are tightly contacted to each other in parallel. A lower limit value of the core distance is defined by the cladding diameter (normally 125 μm) of the optical fiber. Since a finite effective aperture (a diameter which functions as the lens) exists in the rod lens, an upper limit value of the core distance is restricted by this effective aperture. Therefore, it is impossible to tune the selected center wavelength over the sufficient range.

Also, it is normal that the above holder is employed as the practical optical fiber fixing method. Normally the capillary in which through holes, through which the optical fiber is inserted respectively, are opened along the axis of the cylindrical member is employed as this holder. However, since an interval between the through holes is small particularly near the above lower limit value of the core distance, it is difficult to open two through holes while maintaining the core distance at a desired value.

SUMMARY OF THE INVENTION

In order to solve the above-mentioned problems, an object of the present invention is to provide a wavelength selective optical device which is capable of carrying out a wavelength tuning with high precision without being restricted by a clad diameter of an optical fiber and an effective aperture of a rod lens.

A wavelength selective optical device according to the present invention has the following configuration. A lens for transmitting multiplexed optical signals having a plurality of wavelengths is provided to face an end of a first optical fiber such that light output from the end of the first optical fiber is converted into parallel light, and an optical filter is provided at a location to which the parallel light output from the lens is input. A second optical fiber is provided at a location in which the light reflected from the optical filter is input to the lens again to be focused by the lens.

In the wavelength selective optical device having the above-mentioned configuration, the lens is configured by bonding the ends of two gradient index rod lenses having different refractive index distribution constants and the substantially same outer diameter to each other to align their optical axes to each other.

A refractive index distribution N(r) of a radius r of a gradient index rod lens is expressed by the following equation.

$$N(r)=N0 \cdot \{1-((\sqrt{A})^2/2)r^2\}$$

Where, $\sqrt{A}$ denotes a refractive index distribution constant. Even when a core distance between the optical fibers is fixed, the output angle of the light output from the rod lens, that is, the incident angle of the light input to the rod lens, may be changed by changing $\sqrt{A}$, but the rod lenses having different $\sqrt{A}$ may be equivalently configured by variously combining the two gradient index rod lens having different $\sqrt{A}$. Accordingly, the core distance between the two optical fibers need not be adjusted and capillary having different perforated-hole intervals need not be prepared in order to change the core distance. In other words, the restriction due to the core distance is solved and thus it is possible to easily provide a wavelength selective optical device which is capable of accurately tuning a center wavelength.

When combining the two gradient index rod lenses, if the refractive index distribution constants of the two gradient index rod lenses are $\sqrt{A1}$ and $\sqrt{A2}$, respectively, and refractive indices on the center axes are N01 and N02, respectively, lens lengths Z1 and Z2 of the lenses substantially may satisfy $$\tan(\sqrt{A1} \cdot Z1) \cdot \tan(\sqrt{A2} \cdot Z2)=N01 \cdot \sqrt{A1}/(N02 \cdot \sqrt{A2}).$$

By satisfying the condition, the lens having the two rod lenses can be treated as one gradient index rod lens.

In addition, a third optical fiber may be provided at a location in which light transmitted through the optical filter is input to a first end of the gradient index rod lens facing the optical filter and light output from a facing second end is focused.

If the reflected wavelength band is accurately tuned as mentioned above, the transmitted wavelength band is equally tuned and thus it is possible to easily provide a wavelength selective optical device using the reflected light and the transmitted light.

The optical filter may be a multi-layered optical interference filter. Since the reflected wavelength or the transmitted wavelength varies depending on an incident angle in this filter, the object of the present invention can be accomplished.

The optical filter may be directly formed on a second end of a first rod lens. By directly and simultaneously forming dielectric multi-layered films configuring the optical filter on a plurality of rod lenses having different $\sqrt{A}$, it is possible to easily provide wavelength selective optical devices having various center wavelengths.

Alternatively, a cylindrical member which has an inner diameter for allowing a first gradient index rod lens to be inserted without clearance may be prepared, an optical filter chip having an optical filter may be attached one end of the cylindrical member and the first gradient index rod lens may be inserted into the other end of the cylindrical member.

By this configuration, by replacing a plurality of rod lenses having different $\sqrt{A}$ and the same outer diameter, it is possible to easily provide a wavelength selective optical device having a desired center wavelength.

In other words, the first gradient index rod lens may be selected from the plurality of gradient index rod lenses having different $\sqrt{A}$ such that the center wavelength of the light transmitted through or reflected from the optical filter is in a desired range.

When assembling the wavelength selective optical device according to the present invention, the light of a wavelength band from one optical fiber of the dual optical fiber pigtail by the optical filter is input to the rod lens and the light reflected from the optical filter is coupled to the other optical fiber by the rod lens. In addition, the relative locations of the rod lens and the dual optical fiber pigtail are moved and fixed such that the intensity of the coupled light becomes a maximum or a predetermined value or more. Next, a rod lens which is first installed is replaced with another rod lens having a different refractive index distribution constant and a representative value of the reflected wavelength band of the wavelength selective optical device, for example, a center value, is tuned to fall within a predetermined range.

By using the method of tuning the wavelength characteristic, it is possible to the wavelength characteristics of the wavelength selective optical device to a predetermined value without changing the interval between the optical fibers.

According to the present invention, although an optical filter having a center wavelength different from a target center wavelength is manufactured, it is possible to manufacture a wavelength selective optical device which can adequately operate without correcting the distance between two optical fibers. Accordingly, by including a method of producing the optical filter, it is possible to significantly improve production yield.

DETAILED DESCRIPTION OF THE PREFERRED EMBODIMENTS

Figure 1:
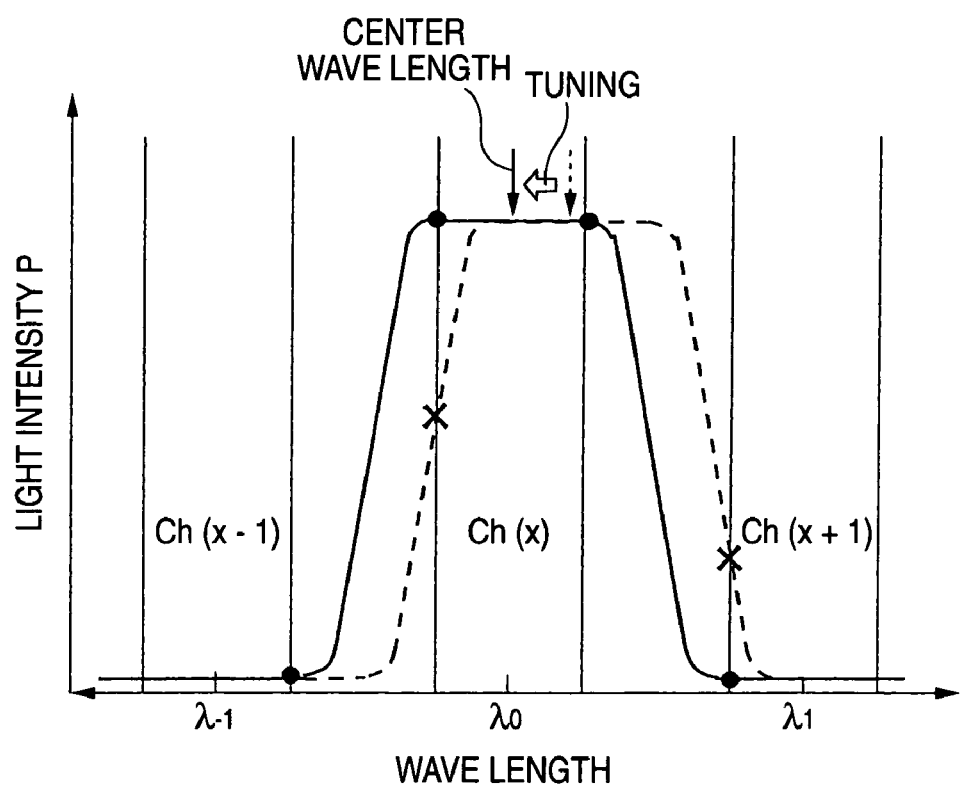
FIG. 1 illustrates a concept of transmitted band spectrum and center wavelength tuning of an optical filter (BPF)
Figure 2:
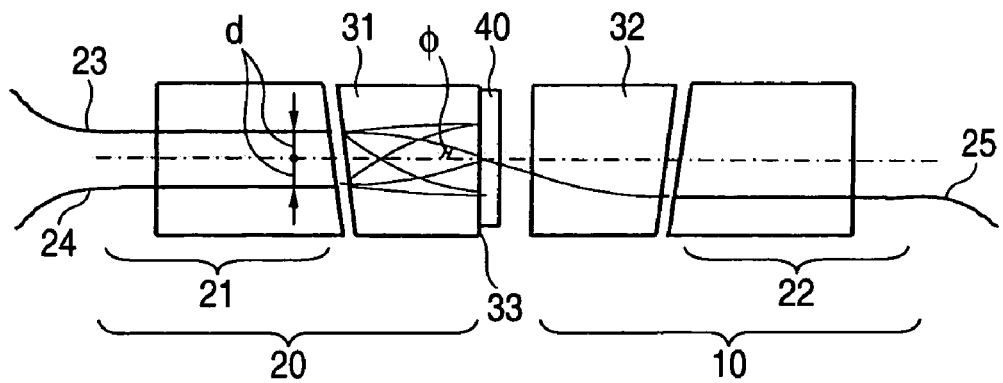
FIG. 2 is a cross-sectional view of a conventional wavelength-multiplexing optical coupler using a gradient index rod lens.

A refractive index distribution $N(r)$ of a radius r of a gradient index rod lens is expressed by the following equation.

$$N(r) = N0 \cdot \{1 - ((\sqrt{A})^2/2)r^2\}$$

Where, $N0$ denotes a refractive index on a center axis of the rod lens and $\sqrt{A}$ denotes a refractive index distribution constant.

In addition, the light beam of the lens is expressed by Equation 1.

$$\begin{pmatrix} r2 \\ \theta2 \end{pmatrix} = \begin{pmatrix} \cos(\sqrt{A} \cdot Z) & \sin(\sqrt{A} \cdot Z)/N0\sqrt{A} \\ -N0\sqrt{A} \cdot \sin(\sqrt{A} \cdot Z) & \cos(\sqrt{A} \cdot Z) \end{pmatrix} \begin{pmatrix} r1 \\ \theta1 \end{pmatrix} \quad \text{(Equation 1)}$$

Where, r1 and $\theta1$ denote an incidence location (distance from an optical axis) and an incident angle (unit: radian) of light beam at a first end of the rod lens, respectively, and r2 and $\theta2$ denote an incidence location (distance from an optical axis) and an output angle (unit: radian) of light beam at a second end of the rod lens, respectively.

When $\sqrt{A} \cdot Z = \pi/2$, Equation 1 is simplified to obtain the following relationship.

$$\theta2 = -N0\sqrt{A} \cdot r1$$

A case of $P = 2\pi/\sqrt{A}$ is referred to as ray sinusoidal wave path period (pitch) of the lens. The relationship of $\sqrt{A} \cdot Z = \pi/2$ corresponds to $Z = P/4$, that is, a case where a lens having a length of 0.25 pitches is used.

In the lens having the length of 0.25 pitches, from the above-mentioned equation, the output angle $\theta2$ is proportional to $\sqrt{A}$ when r1 and N0 are constant, regardless of $\theta1$. In other words, $\sqrt{A}$ of the rod lens is tuned, the output angle of the light output from the rod lens can be adjusted while the core distance $2d$ between optical fibers in a dual optical fiber pigtail (incidence location of the incident light is not changed) and thus the incident angle of the light input to the optical filter can be adjusted.

The adjustment of $\sqrt{A}$ can be performed by adjusting the composition of glass base material, the diameter of the glass base material, an ion exchange condition, etc. In addition, by annealing the lens in a temperature range in which ion mobility increases, $\sqrt{A}$ of the lens which is manufactured once can be readjusted.

Although, in the above description, one lens is used, two or more lenses may be combined. In this case, suppose that a refractive index distribution constant of a first rod lens is $\sqrt{A1}$, a refractive index on a center axis is N01, a lens length is Z1, a refractive index distribution constant of a second rod lens is $\sqrt{A2}$, a refractive index on a center axis is N02, and a lens length is Z2. When two lenses are connected to each other, the light beam is expressed by Equation 2.

$$\begin{pmatrix} r3 \\ \theta3 \end{pmatrix} = \begin{pmatrix} \cos(\sqrt{A2} \cdot Z2) & \sin(\sqrt{A2} \cdot Z2)/N02\sqrt{A2} \\ -N02\sqrt{A2} \cdot \sin(\sqrt{A2} \cdot Z2) & \cos(\sqrt{A2} \cdot Z2) \end{pmatrix} \cdot \begin{pmatrix} \cos(\sqrt{A1} \cdot Z1) & \sin(\sqrt{A1} \cdot Z1)/N01\sqrt{A1} \\ -N01\sqrt{A1} \cdot \sin(\sqrt{A1} \cdot Z1) & \cos(\sqrt{A1} \cdot Z1) \end{pmatrix} \begin{pmatrix} r1 \\ \theta1 \end{pmatrix} \quad \text{(Equation 2)}$$

Where, r1 and $\theta1$ denote an incidence location and an incident angle of light beam at a first end of the first rod lens, respectively, and r3 and $\theta3$ denote an incidence location and an output angle of light beam at a second end of the second rod lens, respectively.

From Equation 2, a condition that the output angle $\theta3$ is not related to $\theta1$ when the incidence location r1 of the light beam is constant is as follows:

$$\tan(\sqrt{A1} \cdot Z1) \cdot \tan(\sqrt{A2} \cdot Z2) = N01 \cdot \sqrt{A1}/(N02 \cdot \sqrt{A2})$$

When $\sqrt{A1}$ and $\sqrt{A2}$ are constant, Z2 satisfying this equation exists with respect to any Z1. In addition, $\theta3$ for r1 is determined by a combination of Z1 and Z2. Actually, $\theta3$ is selected such that the sum of the pitches of two lenses becomes 0.22 to 0.25 or 0.72 to 0.75.

In other words, rod lenses having two kinds of refractive index distribution constants are prepared, lenses having a combination of the lens lengths satisfying the above-mentioned equation are manufactured and bonded, thereby obtaining a desired output angle.

In order to manufacture the lenses having many kinds of $\sqrt{A}$, a series of processes such as ion exchange must be performed by changing the condition many times. In addition, in heating treatment after manufacturing the lens, the adjustment of $\sqrt{A}$ is restricted. Accordingly, if a method of preparing the rod lenses having only two kinds of $\sqrt{A}$ and cutting the rod lenses a plural kinds of lengths is used, the method can be simplified.

As an optical filter according to the present invention, an optical interference filter in which a plurality of layers is laminated is used. By designing a refractive index and a film thickness of a material of each layer made of dielectric, that is, a periodic structure of an optical film thickness, desired wavelength characteristics can be obtained. As a representative example, there are a band pass filter which passes a predetermined wavelength range and reflects the other wavelength range and an edge filter which passes only a wavelength range longer or shorter than a predetermined wavelength and reflects the other wavelength range. By combining the band pass filter and the edge filter, it is possible to realize a gain flattening filter of which transmissivity varies depending on a wavelength for flattening a gain of an optical fiber amplifier. In the present invention, a representative wavelength related to the wavelength characteristics of various kinds of optical filters is tuned. In the band pass filter, a center wavelength of a transmitted wavelength range is used as the representative wavelength and, in the edge filter, a wavelength of which transmissivity is 50% is used as the representative wavelength.

When manufacturing an optical coupler by optically aligning and fixing a subassembly in which an optical filter chip is fixed in the vicinity of one end of a lens end of a dual optical fiber collimator including a dual optical fiber pigtail (provided with two or more optical fibers) and a gradient index rod lens with a single optical fiber collimator including a separate single optical fiber pigtail (or more) and a gradient index rod lens, the center wavelength of the light transmitted through or the light reflected from the optical filter can be adjusted (tuned) by using a combination of different lens lengths.

EXAMPLES

Hereinafter, a method of tuning a wavelength and configuring a wavelength-multiplexing optical coupler which is a wavelength selective optical device will be described in detail with reference to the accompanying drawings. In addition, like reference numerals in the drawings denote like elements.

The present example relates to a wavelength-multiplexing optical coupler having a target center wavelength of a selected bandwidth of 1550.12 nm.

Figure 3:
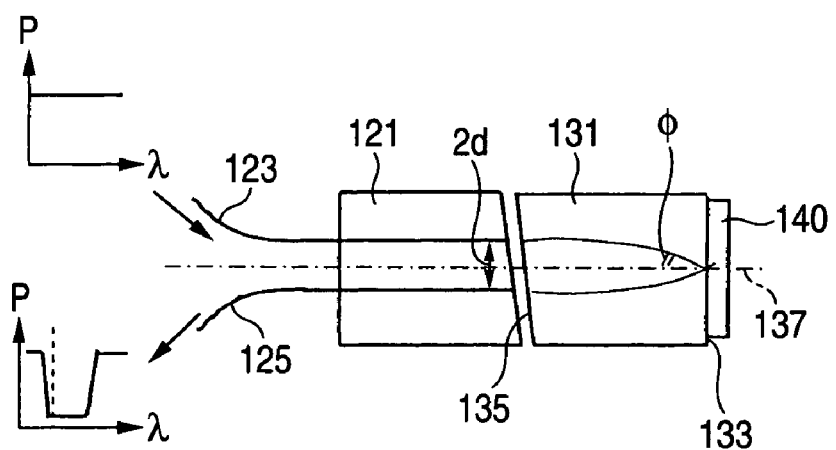
FIG. 3 is a cross-sectional view of a dual optical fiber collimator of a wavelength-multiplexing optical coupler.

A dielectric multi-layered BPF having a transmission bandwidth of 0.3 nm was formed on a glass substrate. As illustrated in FIG. 3, a BPF chip (optical filter) 140 is pressed and fixed to an output end 133 of a gradient index rod lens 131 having a refractive index distribution constant $\sqrt{A}$ of 0.326 $mm^{-1}$ and a lens length of 0.25 pitches using a jig.

It is preferable that an input end 135 of the rod lens 131 is inclined to a center axis 137 of the rod lens 131 such that the incident light is prevented from returning to an optical fiber. A dual optical fiber pigtail 121 faces the end 135 and the location thereof is aligned. In addition, two optical fibers 123 and 125 are general single-mode optical fibers having a clad diameter of 125 μm. The two optical fibers are closely adhered to each other such that a core distance becomes 125 μm.

In alignment, laser light having a bandwidth of 1.55 μm and a wavelength other than the wavelength transmitted through the optical filter 140 is input to one optical fiber (first optical fiber) 123. The light is reflected from the optical filter 140 and outputs from the end 135 through the rod lens 131. The alignment is performed by relatively moving the rod lens 131 and the optical fiber pigtail 121 such that the amount of the light coupled to the optical fiber (second optical fiber) 125 becomes a maximum.

After the alignment is completed, the wavelength of the laser light is swept over 5 nm and transmitted wavelength spectrum is measured. At a result, with respect to the target center wavelength of 1550.12 nm, a center wavelength measured actually is 1550.26 nm.

Figure 4A:
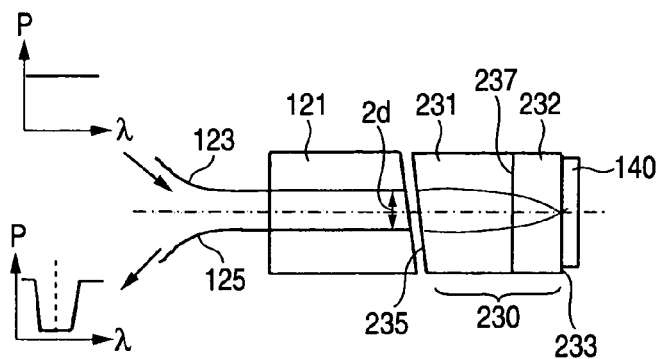
FIGS. 4A and 4B are cross-sectional views of a wavelength-multiplexing optical coupler according to the present invention.

Accordingly, as illustrated in FIG. 4A, a complex lens 230 obtained by heating and pressing (optical contact) a first rod lens 231 having $\sqrt{A}$=0.326 $mm^{-1}$ and a length of 0.100 pitches and a second rod lens 232 having $\sqrt{A}$=0.418 $mm^{-1}$ and a length of 0.128 pitches is prepared. Similar to the case of using one rod lens, it is preferable that the end 235 facing the optical fiber of the first rod lens is inclined to the optical axis. A bonding surface 237 between two lenses may be perpendicular to the optical axis. As illustrated in FIG. 4A, the complex lens 230 is replaced with the lens 121 of FIG. 3 to align the location of the optical fiber pigtail 121 again. As a result, since spectrum of a center wavelength of 1550.14 nm is obtained, a dual optical fiber collimator is completed by bonding and fixing each member with epoxy resin. By increasing equivalent $\sqrt{A}$ by a combination of two kinds of rod lenses, it was possible to tune the wavelength to a short wavelength side by 0.12 mm.

Figure 4B:
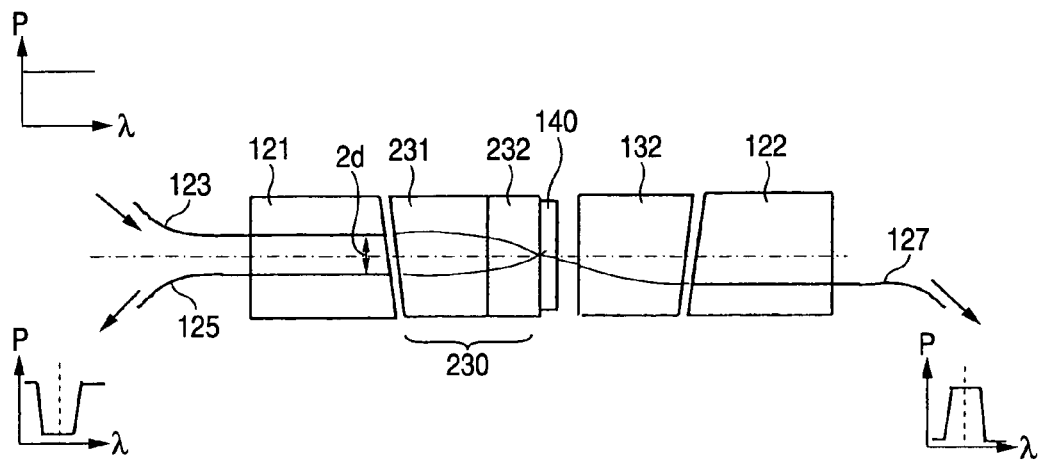

After the dual collimator having the optical filter is completed, the location of a single optical fiber collimator including a single optical fiber pigtail 122 having a third optical fiber 127 and a rod lens 132 is aligned such that the amount of the light transmitted through the optical filter 140 coupled to the single optical fiber collimator becomes a maximum as illustrated in FIG. 4B, and the two collimators are bonded and fixed to each other with epoxy resin, thereby completing a 3-port optical coupler.

In the spectrum of the light transmitted through the optical filter, the shapes of a transmitted band and a blocked band are opposite to those in the spectrum of the light reflected from the optical filter, but the center wavelength is accurately 1550.14 nm, which is equal to that of the reflected light.

A relationship between the combination of the lenses and wavelength shift is illustrated in Table 1.

TABLE 1

| First lens | | Second lens | | Incident angle of light input to optical filter | | Center wavelength | Wavelength shift |
|---|---|---|---|---|---|---|---|
| $\sqrt{A}$ ($mm^{-1}$) | pitch | $\sqrt{A}$ ($mm^{-1}$) | pitch | [deg] | [rad] | [nm] | [nm] |
| 0.326 | 0.250 | 0.418 | 0.000 | 1.842 | 0.0321 | 1549.68 | −0.317 |
|  | 0.230 |  | 0.015 | 1.848 | 0.0323 | 1549.68 | −0.319 |
|  | 0.200 |  | 0.038 | 1.880 | 0.0328 | 1549.67 | −0.330 |
|  | 0.180 |  | 0.054 | 1.917 | 0.0335 | 1549.66 | −0.343 |
|  | 0.150 |  | 0.080 | 1.995 | 0.0348 | 1549.63 | −0.372 |
|  | 0.120 |  | 0.108 | 2.096 | 0.0366 | 1549.59 | −0.410 |
|  | 0.100 |  | 0.128 | 2.173 | 0.0379 | 1549.56 | −0.441 |
|  | 0.080 |  | 0.150 | 2.251 | 0.0393 | 1549.53 | −0.473 |
|  | 0.050 |  | 0.185 | 2.358 | 0.0412 | 1549.48 | −0.519 |
|  | 0.020 |  | 0.224 | 2.429 | 0.0424 | 1549.45 | −0.551 |
|  | 0.005 |  | 0.243 | 2.443 | 0.0426 | 1549.44 | −0.557 |
| 0.418 | 0.250 | 0.326 | 0.000 | 2.445 | 0.0427 | 1549.44 | −0.558 |

TABLE 1-continued

| First lens | | Second lens | | Incident angle of light input to optical filter | | Center wavelength | Wavelength shift |
|---|---|---|---|---|---|---|---|
| $\sqrt{A}$ (mm$^{-1}$) | pitch | $\sqrt{A}$ (mm$^{-1}$) | pitch | [deg] | [rad] | [nm] | [nm] |
| 0.230 | | | 0.026 | 2.431 | 0.0424 | 1549.45 | −0.552 |
| 0.200 | | | 0.065 | 2.362 | 0.0412 | 1549.48 | −0.521 |
| 0.180 | | | 0.089 | 2.294 | 0.0400 | 1549.51 | −0.491 |
| 0.150 | | | 0.122 | 2.177 | 0.0380 | 1549.56 | −0.442 |
| 0.120 | | | 0.152 | 2.065 | 0.0360 | 1549.60 | −0.398 |
| 0.100 | | | 0.170 | 1.999 | 0.0349 | 1549.63 | −0.373 |
| 0.080 | | | 0.187 | 1.944 | 0.0339 | 1549.65 | −0.353 |
| 0.050 | | | 0.212 | 1.882 | 0.0328 | 1549.67 | −0.331 |
| 0.020 | | | 0.235 | 1.849 | 0.0323 | 1549.68 | −0.319 |
| 0.005 | | | 0.246 | 1.843 | 0.0322 | 1549.68 | −0.317 |

Design wavelength: 1550 nm

In Table 1, the wavelength shift represents a value in a case of using an optical filter having a design reference wavelength of 1550 nm when a vertical light is input. In a case of a single lens at an uppermost end having a refractive index distribution constant $\sqrt{A}$=0.326 mm$^{-1}$ and a lens length of 0.25 pitches, a wavelength is shifted from 1550 nm by −0.317 nm by oblique incidence. In a case of a combination of a lens having a refractive index distribution constant $\sqrt{A}$=0.326 mm$^{-1}$ and a lens length of 0.100 pitches and a lens having a refractive index distribution constant $\sqrt{A}$=0.418 mm$^{-1}$ and a lens length of 0.128 pitches, the wavelength is shifted by −0.441 nm and the wavelength tuning of −0.124 nm can be performed, which are sufficiently equal to the actually measuring result.

In addition, although, in the present embodiment, the ends of the rod lenses which are precisely polished to a plane are bonded to each other using an optical contact, not an adhesive, the ends of the rod lenses contact with each other using an optical adhesive having the same refractive index. Alternatively, two lenses may be fixed by contacting the ends of the rod lenses on which nonreflecting films are optically coated with each other and fixing the peripheries thereof with an adhesive, while an adhesive is not inserted into an optical path.

Furthermore, although, in the above-mentioned example, the optical filter is manufactured on the glass substrate, the optical filter may be directly formed on the end of the second gradient index rod lens 232. Since directly forming the optical filter on the end of the rod lens can be simultaneously performed with respect to a plurality of lenses, it is possible to simultaneously form dielectric multi-layered films having the same film configuration with respect to plural kinds of lenses having different lens lengths.

It is convenient that the following configuration is used for replacing a plurality of complex lenses and performing the wavelength tuning.

Figure 5A:
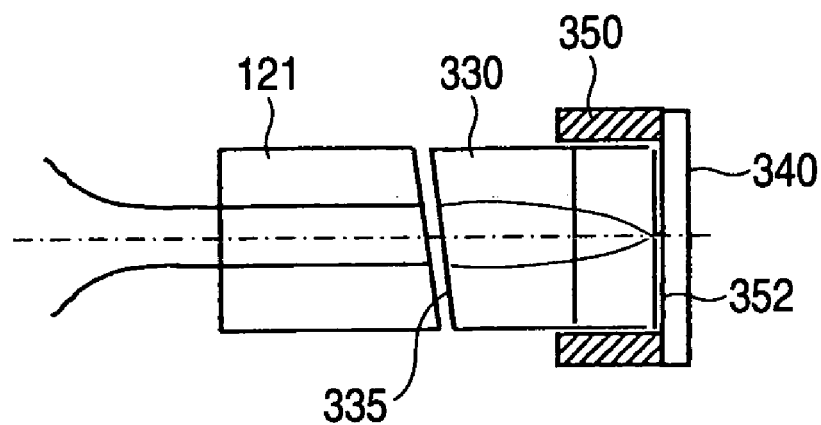
FIGS. 5A and 5B are cross-sectional views illustrating a structure of a wavelength-multiplexing optical coupler according to the present invention.
Figure 5B:
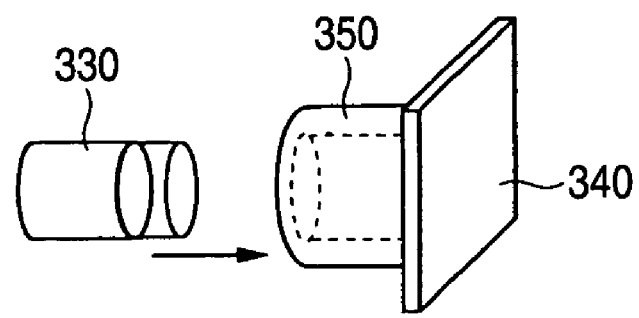

As illustrated in FIGS. 5A and 5B, a BPF chip (optical filter) 340 having a dimension of 1.8 mm and a transmission bandwidth of 0.32 nm is bonded to one end 352 of a glass tube (cylindrical member) 350 having an inner diameter 1.81 mm, an outer diameter 2.6 mm, and a length of 2 mm. A compound lens 330 in which two rod lenses each having an outer diameter 1.80 mm are bonded to each other is inserted into the tube 350 to be in contact with the optical filter 340, and a dual optical fiber pigtail 121 having a core distance of 125 μm is positioned to face an end (first section) 335 opposite to an end 333 of the lens 330 contacting the BPF chip and the location of the dual optical fiber pigtail 121 is aligned.

If the wavelength adjustment is insufficient, the compound lens 330 is removed from the glass tube 350 and closely attached with a separate complex lens, and the optical fiber pigtail 121 is aligned again. After the alignment is completed, fixing the glass tube 350 and the compound lens 330, and the optical filter 340, the opposite lens end 335, and the dual optical fiber pigtail 121, a dual optical fiber collimator having the filter can be manufactured. The same is true in the single optical fiber collimator for the light transmitted through the filter.

Although, in the above-mentioned embodiments, an optical coupler for tuning a center wavelength of a BPF and dividing one channel signal selected from an incident signal is illustrated, the present invention may apply to another wavelength selective optical device.

A plurality of channels may be selected, not one channel. In this case, an edge filter, that is, SWPF or LWPF is used. A wavelength edge must be tuned with precision of few nm or less and thus the present invention can be used.

In addition, for example, in the optical add/drop module, a plurality of optical filters is used and an optical fiber having 3 ports or more is used, but the wavelength standard of a selected channel group is equal to the above description and the present invention may apply to the adjustment of the wavelength edge thereof.

Although, in the above description, a wavelength-multiplexing optical coupler used in wavelength-multiplexing communication by multiplexing optical signals having a plurality of discrete wavelengths is illustrated, the present invention may apply to another wavelength selective optical device.

For example, a gain of an erbium-doped fiber-optical amplifier (EDFA) which is widely used for amplifying attenuated light transmitted by an optical fiber depends on a wavelength. In order to flatten gain variation due to the wavelength, a gain flattening filter is used. In order to perform flattening with high precision, the wavelength characteristics of the filter need be tuned and thus the present invention may be used.

In addition, when the light input to a rod lens has successive spectrum, not discrete spectrum, even a case where a portion of the successive spectrum is desired to be selected using an optical filter, the present invention may be used. For example, when light in a narrow wavelength range is desired to be selected from light having wide spectrum width, which is emitted from a super luminescence diode, light beam reflected from or transmitted through an optical filter is used by directly inputting light output from the diode which is a light source to a gradient index rod lens. The present invention may be used to select a wavelength of the light beam with good precision. The same is true in a case of extracting a narrow wavelength from ASE light output from EDFA. The light beam is not limited to be coupled to an optical fiber and may be converted into an electrical signal by inputting the light reflected from or transmitted through an optical filter to a light receiving element.

What is claimed is:

1. A wavelength selective optical device connecting a first optical fiber with an end face to a second optical fiber, comprising:

a collimating lens having a first end surface located such that a divergent light emitted from the end face of a first optical fiber is incident, and having a second end surface, the collimating lens arranged to emit the incident divergent light as a parallel light beam emitted from the second end surface; and an optical filter arranged to face the second end surface of the collimating lens so that the parallel light beam emitted from the collimating lens is incident on the optical filter, wherein the collimating lens and the optical filter are arranged such that a reflected light by the optical filter is incident back to the lens and input to the second optical fiber which is located at a location in which the reflected light is focused by the lens, wherein the collimating lens is provided with two gradient index rod lenses having different refractive index distribution constants relative to each other, wherein said two gradient index rod lenses have substantially the same outer diameter, and are bonded to each other so that optical axes of said two gradient index rod lenses are aligned, and wherein the refractive index distribution constants of said two gradient index rod lenses are $\sqrt{A1}$ and $\sqrt{A2}$, respectively, and refractive indices on center axes are $N01$ and $N02$, respectively, and respective lens lengths $Z1$ and $Z2$ of the lenses substantially satisfy:

$$\tan(\sqrt{A1}\cdot Z1)\cdot\tan(\sqrt{A2}\cdot Z2)=N01\cdot\sqrt{A1}/(N02\cdot\sqrt{A2}).$$

2. A wavelength selective optical device connecting a first optical fiber with an end face to a second optical fiber, comprising:

a collimating lens having a first end surface located such that a divergent light emitted from the end face of a first optical fiber is incident, and having a second end surface, the collimating lens arranged to emit the incident divergent light as a parallel light beam emitted from the second end surface; and an optical filter arranged to face the second end surface of the collimating lens so that the parallel light beam emitted from the collimating lens is incident on the optical filter, wherein the collimating lens and the optical filter are arranged such that a reflected light by the optical filter is incident back to the lens and input to the second optical fiber which is located at a location in which the reflected light is focused by the lens, wherein the collimating lens is provided with two gradient index rod lenses having different refractive index distribution constants relative to each other, and wherein said two gradient index rod lenses have substantially the same outer diameter, and are bonded to each other so that optical axes of said two gradient index rod lenses are aligned; and another gradient index rod lens having a first end surface thereof facing the optical filter, and a third optical fiber arranged on a side of a second end surface of said another gradient index rod lens to which a light transmitted through the optical filter is coupled through the second gradient index rod lens.

3. A wavelength selective optical device according to claim 1, wherein the optical filter is a multi-layered optical interference filter.

4. A wavelength selective optical device according to claim 3, wherein the optical filter is formed directly on the second end surface of the collimating lens as a film.

5. A wavelength selective optical device connecting a first optical fiber with an end face to a second optical fiber, comprising:

a collimating lens having a first end surface located such that a divergent light emitted from the end face of a first optical fiber is incident, and having a second end surface, the collimating lens arranged to emit the incident divergent light as a parallel light beam emitted from the second end surface; and an optical filter arranged to face the second end surface of the collimating lens so that the parallel light beam emitted from the collimating lens is incident on the optical filter, wherein the collimating lens and the optical filter are arranged such that a reflected light by the optical filter is incident back to the lens and input to the second optical fiber which is located at a location in which the reflected light is focused by the lens, wherein the collimating lens is provided with two gradient index rod lenses having different refractive index distribution constants relative to each other, and wherein said two gradient index rod lenses have substantially the same outer diameter, and are bonded to each other so that optical axes of said two gradient index rod lenses are aligned; and a cylindrical member arranged such that the collimating lens is inserted from one end of the cylindrical member and wherein the collimating lens is fitted without clearance to the cylindrical member, wherein the optical filter is provided on an end portion of the cylindrical member opposite the one end.

6. A method of tuning a wavelength characteristic of a wavelength selective optical device, in which a divergent light is collimated and incident on an optical filter through a lens, a predetermined wavelength range of the light incident thereon is reflected or transmitted by the optical filter, wherein the lens is provided with two gradient index rod lenses bonded to each other that have different refractive index distribution constants and the same outer diameter to each other to align optical axes of said two gradient index rod lenses, the method comprising the steps of:

fixing the optical filter closely adhered to one end of the lens for transmitting or reflecting a predetermined wavelength band;

fixing two optical fibers to the other end of the lens at a predetermined interval;

inputting light having the wavelength band reflected by the optical filter from one of the optical fibers to the lens;

coupling the light reflected by the optical filter to the other of the optical fibers by the lens;

adjusting relative locations of the two optical fibers fixed to the rod lenses at the predetermined interval such that an intensity of the coupled light becomes a maximum or a predetermined value or more, and changing a combination of lens lengths of the two rod lenses of the fixed wavelength selective optical device to adjust a representative value of the reflected wavelength band in a predetermined range.

* * * * *